April 27, 1943.     V. G. VAUGHAN ET AL     2,317,831
THERMOSTATIC DEVICE
Original Filed April 1, 1939
FIG.I.
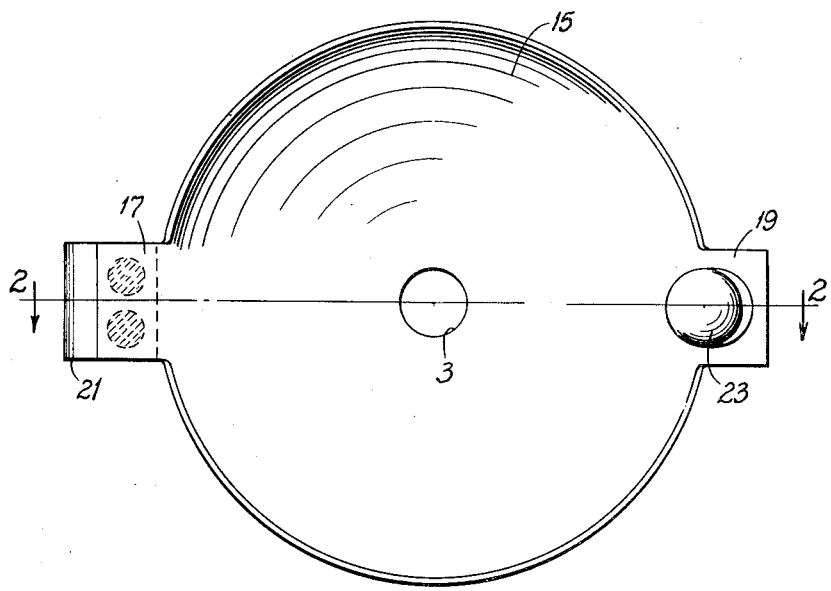
FIG.2.
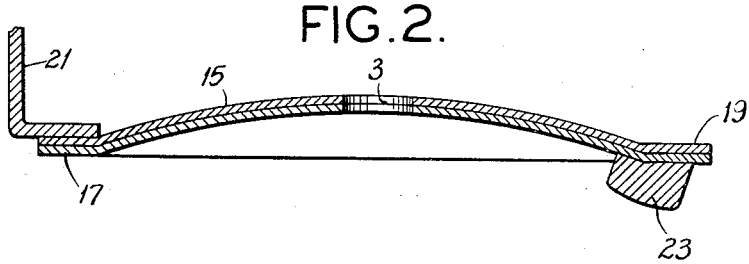
Victor G. Vaughan,
John D. Bolesky.
Inventors.
Haynes and Koenig,
Attorneys.

Patented Apr. 27, 1943

2,317,831

UNITED STATES PATENT OFFICE 2,317,831

THERMOSTATIC DEVICE

Victor G. Vaughan and John D. Bolesky, Attleboro, Mass., assignors to Metals & Controls Corporation, Attleboro, Mass., a corporation of Massachusetts Original application April 1, 1939, Serial No. 265,406. Divided and this application October 4, 1941, Serial No. 413,680

2 Claims. (Cl. 297—15)

This invention relates to thermostats, and with regard to certain more specific features, to snap-acting thermostatic discs, to which are welded extraneous elements.

The invention is a division of the invention disclosed in the United States patent application Serial No. 265,406, filed by us on April 1, 1939, for Thermostatic devices and method of manufacturing the same.

Among the several objects of the invention may be noted the provision of thermostats of the class described which include, relatively permanently autogenously-joined thereto, one or more extraneous elements such as electrical contacts, supporting members, and the like, the autogenous type of jointure permitting the economical construction of the thermostats in question; the provision of thermostats of the class described which are accurately calibrated and have reliable operating characteristics, which operating characteristics do not appreciably change with multiple successive operations of the thermostat, whereby the thermostat is reliable in operation at the temperatures for which it is calibrated over its entire normal life; the provision of thermostats including associated extraneous elements, wherein the system functions more reliably and constantly over long operating periods; and the provision of thermostats which are relatively simple and economical. Other objects will be in part obvious and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawing, in which is illustrated one of various possible embodiments of the invention:

Fig. 1 is a bottom plan view of the invention; and,

Fig. 2 is a cross section taken on line 2—2 of Fig. 1.

Similar reference characters indicate corresponding parts throughout the several views of the drawing.

In converting a thermostat into a useful control deivce, such as an electric switch or valve, for example, it is almost invariably necessary that certain extraneous elements be attached to the thermostat. For example, in making a thermostatically actuated switch, it is usually necessary to attach electric contact buttons to the thermostat.

As long as the thermostat is a simple bimetallic thermostatic metal strip, of developable shape, the problem of attachment is not a serious one, because the attachment can readily be made to a region or area of the thermostatic metal that, in operation, undergoes substantially no change of shape, or to a region or area which, by the attachment, may safely be restrained against change of shape while the remainder of the thermostat undergoes such change, or to a region in which there is little stress.

With non-developable snap-acting thermostatic discs, such as those of the type disclosed and claimed in John A. Spencer Patent 1,448,240, for example, the problem of attachment is a much more serious one. This is because any restraint imposed upon an area of the disc which, in the snapping activity of the disc, undergoes change of form or shape, imposes a deterrent effect upon such change of shape, resulting in the decalibration of the disc or possibly even the destruction of its snapping capability.

Numerous solutions of this problem of attachment of extraneous elements to snap-acting thermostatic discs have heretofore been proposed. See, for example, Patents 1,697,886, 1,711,430, 1,776,012, 1,845,997 and 1,939,286. In each of these patents, however, relatively complicated mechanical systems are involved in the attachment, and such complications necessarily add seriously to the cost of manufacture of controls.

Least of all has it heretofore been considered by thermostat experts that extraneous devices of the character concerned could be autogenously joined, as by welding, to the active areas of such thermostatic discs. The thought has been that with the inherent delicate, balanced stresses in the snap-acting disc, no welding operation whatsoever could be conducted within the active area of the thermostat without so seriously impairing its operating characteristics as to make it substantially entirely unsuited for reliable control usage.

The consequences of the present discovery that such welding could be done are manifold, and highly important. In the first place, it is possible to attach extraneous elements, such as contacts, supports, and the like, to thermostatic discs with an economy and at a cost heretofore considered entirely out of reach. In the second place, the autogenous character of the joint between the disc and the extraneous elements makes the electrical resistance of the connection so much more uniform both initially and during the life of the thermostat, than has heretofore been possible, that the resulting controls are adapted for usage in a wide variety of circuits from which they were heretofore excluded. With an electrical contact button welded to a disc, for example, substantially uniform resistance is encountered in the joint itself, and the disc itself may consequently be made part of an electrical circuit without serious changes in calibration due to resistance changes. When heretofore electrical connections have been made directly to a disc through a riveted joint, furthermore, the resistance at the joint has introduced a greater localized heat production at that point than in the case of the welded joint, which localized heating not only was an uneconomic loss of energy, but also introduced uncontrolled and sometimes severe heating at particular regions of the disc with the result that the operating characteristics of the disc itself were impaired. With an autogenously joined contact, however, there is no deleterious and changeable heat production at the region of joint between the extraneous element and the disc, and consequently no tendency to affect the operating characteristics of the disc.

Furthermore, the welded joint between the disc and the extraneous element permits more direct, positive, and quick conduction of heat into the disc through the extraneous element, in a structure where the disc is heated by conduction. Prior joints employed for this purpose were notorious in the poor efficiency with which they conducted heat to the disc. The present invention clears the way for a broader use of the snap-acting disc than has hitherto been possible.

Referring now more particularly to Fig. 1, there is shown at 15 a snap-acting, dished, composite, thermostatic metal disc, basically of the type set forth and claimed in John A. Spencer Patent 1,448,240. The disc is centrally perforated as shown at numeral 3. This disc has a pair of projecting ears 17 and 19. Welded to the disc 15 in the region of the projection 17 is a supporting member or bracket 21. While the region of jointure is here outside of the active area of the disc (as defined by a circular extension across the projection of the curved periphery of the disc), the preferred welding technique hereinafter set forth should still be used, in order to avoid annealing the rim of the disc. To the opposite projection 19, and extending into the active area of the disc, is welded an electric contact button 23.

The particular welding technique to be used is a matter of individual choice, being dependent in some respects on the composition of the thermostatic metal used. In general, however, the welding time should be as short as possible, to avoid introducing any more heat than is absolutely necessary into the disc 25. We have found it satisfactory to use electrical resistance or projection methods of welding, with high current density so that the time consumed in making the weld is extremely short (such as a one-half-cycle weld). By thus shortening the actual welding time, the area of the disc 25 heated as a consequence of the welding operation is relatively localized to the regions underlying the contact buttons 5. If desired, non-autogenous welding may be used in some cases without sacrificing certain of the advantages otherwise disclosed.

The word weld is used herein with its dictionary meaning quoted by the C. C. P. A. in the Copperweld decision, 62 F. (2nd) 363: "to unite closely or intimately; to join closely."

From the above, it will be seen that the element 15 constitutes a conducting composite thermostatic metallic sheet having a non-developable surface, which is adapted to change its shape suddenly upon reaching a predetermined temperature. This surface extends to the edge of the element. There are metallic extensions from the peripheral portion of this surface in the form of the ears 17 and 19, and also the contact 23. The unbroken, continuous metallic characteristic of these extensions results in important advantages over riveted extensions, for example. When a rivet is placed through a composite, snap-acting, thermostatic disc, it cannot be squeezed tight into the rivet hole without changing the calibration of the disc. Such squeezing is unsatisfactory, because of the variation in the binding effect of the rivet upon the disc caused by differences in tightness of the rivets in different units. In addition, when such thermostats are operated, the forcing of the bimetal and its change of shape loosen the rivets and the binding effect is diminished with such loosening, with resulting inconsistencies in calibration during use. Where electricity is to be conducted into and out of the disc by means of the rivet, the loosening of the rivet referred to above results in deleterious localized heating and some times burning out of the disc at that point, in addition to calibration changes.

The present invention solves the problem of how to make a disc with extensions connected thereto which will avoid the above difficulties.

This thermostat when used as a self-heating switch has a higher interrupting capacity than would a disc with an edge passing through the ends of the ears 19. This is because there has been eliminated edge material between the ears which would be slow heating and inefficient, since it lies off the main current path between the ears 17 and 19. Heating is also more uniform with this material eliminated. And in any case the current density crosswise of the disc between ears 17 and 19 is more uniform.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. A thermostatic element comprising a conducting composite thermostatic metallic sheet part having a non-developable surface adapted to change its shape suddenly upon reaching a predetermined temperature, said surface extending to at least a substantial portion of the edge of said element, and a pair of ears formed integrally with said metallic sheet, the ratio of the width of each of the said ears to the maximum width of the non-developable surface being less than one, and electrical connecting means welded to said ears whereby there is eliminated slow-heating edge material between said ears, which would reduce the uniformity of the electric-heating throughout the sheet.

2. A thermostatic element comprising a conducting composite thermostatic metallic sheet part having a non-developable surface adapted to change its shape suddenly upon reaching a predetermined temperature, said surface extending to at least a substantial portion of the edge of said element, whereby a substantial peripheral portion is in said surface, a pair of ears formed integrally with said metallic sheet, and electrical connecting means welded to said ears in such position that the distance from one of said electrical connections to the other is greater than the width across said non-developable surface whereby more uniform heating and accelerated change of shape of the thermostatic sheet is produced thereby considerably reducing danger of burn-out before said change in shape occurs.

VICTOR G. VAUGHAN.
JOHN D. BOLESKY.